(12) United States Patent
Lagace et al.

(10) Patent No.: US 9,465,137 B2
(45) Date of Patent: Oct. 11, 2016

(54) OPTICAL COUPLERS USED IN A DOWNHOLE SPLITTER ASSEMBLY

(71) Applicant: Weatherford Technology Holdings, LLC, Houston, TX (US)

(72) Inventors: Michael Lagace, Higganum, CT (US); David Labella, Higganum, CT (US); Domino Taverner, Delray Beach, FL (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 14/280,020

(22) Filed: May 16, 2014

(65) Prior Publication Data

US 2014/0339411 A1 Nov. 20, 2014

Related U.S. Application Data

(60) Provisional application No. 61/824,541, filed on May 17, 2013.

(51) Int. Cl.
| | |
|---|---|
| *G01D 5/353* | (2006.01) |
| *G01V 8/00* | (2006.01) |
| *G01L 9/00* | (2006.01) |
| *G01K 11/32* | (2006.01) |
| *G02B 6/36* | (2006.01) |

(52) U.S. Cl.
CPC ............. *G01V 8/00* (2013.01); *G01D 5/35316* (2013.01); *G01D 5/35354* (2013.01); *G01D 5/35387* (2013.01); *G01K 11/32* (2013.01); *G01K 11/3206* (2013.01); *G01L 9/0076* (2013.01); *G01L 9/0077* (2013.01); *G02B 6/36* (2013.01)

(58) Field of Classification Search
CPC ................ G01D 5/35316; G01D 5/35387; G01D 5/35354; G01K 11/32; G01K 11/3206; G01L 9/0077; G01L 9/0076
See application file for complete search history.

(56) References Cited

U.S. PATENT DOCUMENTS

| | | | | |
|---|---|---|---|---|
| 4,826,275 A | * | 5/1989 | Heinzman | H04B 10/2725 385/46 |
| 2013/0070235 A1 | | 3/2013 | Chen et al. | |

FOREIGN PATENT DOCUMENTS

| | | |
|---|---|---|
| DE | 4215167 A1 | 11/1993 |
| DE | 4332501 A1 | 3/1995 |
| DE | 19548920 A1 | 7/1996 |
| WO | 03098156 A1 | 11/2003 |

OTHER PUBLICATIONS

International Search Report and Written Opinion dated Oct. 17, 2014, issued by the European Patent Office in Application No. PCT/US2014/038419.

* cited by examiner

*Primary Examiner* — Tony Ko
(74) *Attorney, Agent, or Firm* — Patterson & Sheridan, L.L.P.

(57) ABSTRACT

Techniques and apparatus are provided for downhole sensing using optical couplers in a downhole splitter assembly to split interrogating light signals into multiple optical sensing branches. Each optical branch may then be coupled to an optical sensor (e.g., a pass-through or an optical single-ended transducer (OSET)) or to another optical coupler for additional branching. The sensors may be pressure/temperature (P/T) type transducers. Some systems may exclusively use OSETs as the optical sensors. In this manner, if one of the OSETs is damaged, it does not affect light traveling to any of the other sensors, and sensing information from remaining sensors is still returned.

19 Claims, 11 Drawing Sheets

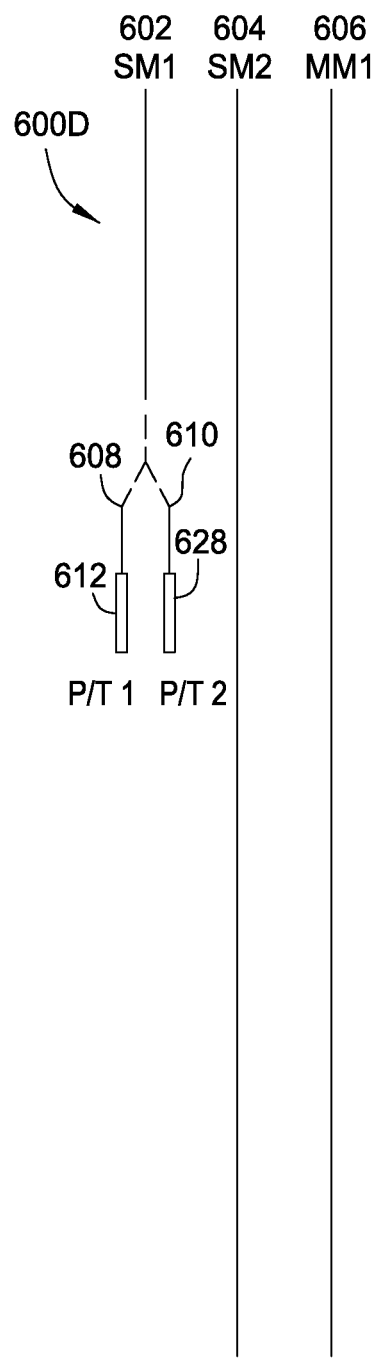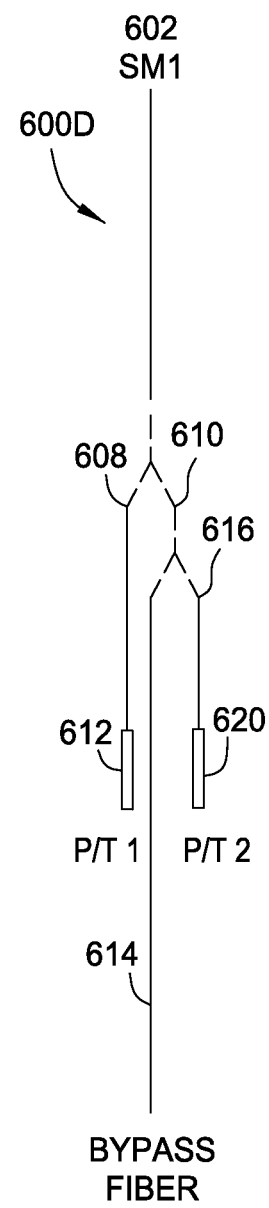
FIG. 6D
FIG. 6E

OPTICAL COUPLERS USED IN A DOWNHOLE SPLITTER ASSEMBLY

CROSS-REFERENCE TO RELATED APPLICATIONS

This application claims benefit of U.S. Provisional Patent Application Ser. No. 61/824,541, filed May 17, 2013 and entitled "OPTICAL COUPLERS USED IN A DOWNHOLE SPLITTER ASSEMBLY," which is herein incorporated by reference.

BACKGROUND OF THE INVENTION

1. Field of the Invention

Embodiments of the present invention generally relate to downhole sensing and, more particularly, to optical couplers used in a downhole splitter assembly.

2. Description of the Related Art

The world's reservoirs are aging. This translates to increased water production and gas coning, increased lifting costs, expensive treatment of produced water, and high cost of deferred or lost hydrocarbon production. Hence, it is becoming increasingly important to accurately measure and understand conditions inside a well, reservoir, or field. Downhole sensing offers measurement near the areas of interest—e.g., near the wellbore or reservoir—and thus offers potential for higher quality data, more insight across a sandface, and measurement of parameters that are not available on the surface. This information can be used to optimize production, locate water or gas coning, manage fractures or fluid movement in the reservoir from seismic disturbances, etc.

In the hydrocarbon industry, there is considerable value associated with the ability to monitor the flow of hydrocarbon products in the production pipe of a well in real time. For example, formation properties that may be important in producing from, injecting into, or storing fluids in, downhole subsurface reservoirs comprise pressure, temperature, porosity, permeability, density, mineral content, electrical conductivity, and bed thickness. Further, fluid properties, such as viscosity, chemical elements, and the content of oil, water, and/or gas, may also be important measurements. Downhole properties may be measured by a variety of sensing systems including acoustic, electrical, magnetic, electro-magnetic, strain, nuclear, and optical based devices.

Many optical components have a characteristic wavelength that may be found by interrogating the optical component with an optical source capable of producing light at various wavelengths over a fixed range or bandwidth. For example, fiber Bragg gratings (FBGs) (typically formed by photo-induced periodic modulation of the refractive index of an optical waveguide core) are highly reflective to light having wavelengths within a narrow bandwidth centered at a wavelength generally referred to as the Bragg wavelength. Because light having wavelengths outside this narrow bandwidth is passed without reflection, Bragg wavelengths can be determined by interrogating a Bragg grating with a light source swept across a bandwidth that includes the Bragg wavelength and monitoring the reflected optical power spectrum at a receiver unit. Because Bragg wavelengths are dependent on physical parameters, such as temperature and strain, Bragg gratings can be utilized in optical sensor systems to measure such parameters.

In these and a wide range of other types of optical systems, the measurement of a characteristic wavelength of an optical component to great accuracy (and/or with great repeatability) is important to system performance. Two significant parameters determining the error of any such measurement are the signal-to-noise ratio (SNR) and effective integration time of the measuring system. SNR is dependent of many factors including received optical power, optical-source noise, and receiver noise. The effective integration time is dependent on overall averaging time and the proportion of that time which is producing useful signals at the receiver unit. Improving these two parameters can improve characteristic wavelength measurement repeatability and accuracy.

SUMMARY OF THE INVENTION

Embodiments of the present invention generally relate to downhole sensing using optical couplers in a downhole splitter assembly to split interrogating light signals into multiple optical sensing branches.

One embodiment of the present invention is a processing system for optical interrogation. The processing system generally includes a light source for generating interrogating light signals; at least first and second optical sensing branches located downhole in or near a wellbore, each of the branches having at least one single-ended optical sensor to measure one or more downhole parameters that does not pass the interrogating optical signals through; a first optical waveguide for guiding the interrogating light signals downhole to interrogate optical sensors in each of the first and second optical sensing branches; a first optical coupler to split the interrogating light signals between the first and second optical sensing branches and to guide light signals reflected from the first and second optical sensing branches back to the first optical waveguide; and a processor to determine the one or more downhole parameters based, at least in part, on the reflected light signals Another embodiment of the present invention provides a system. The system generally includes at least first and second optical sensing branches located downhole in or near a wellbore, each of the branches having at least one single-ended optical sensor to measure one or more downhole parameters that does not pass the interrogating optical signals through; a first optical waveguide for guiding interrogating light signals downhole to interrogate optical sensors in each of the first and second optical sensing branches; and a first optical coupler to split the interrogating light signals between the first and second optical sensing branches and to guide light signals reflected from the first and second optical sensing branches back to the first optical waveguide.

Yet another embodiment of the present invention provides a method. The method generally include introducing an optical signal, by an optical light source, into a first optical waveguide for guiding the optical signal downhole to interrogate at least a first single-ended optical sensor in a first optical sensing branch and a second single-ended optical sensor in a second optical sensing branch located downhole in or near a wellbore and to a first optical coupler to split the optical signal between the first and second optical sensing branches and for guiding light signals reflected from the first and second optical sensing branches back to the first optical waveguide, wherein the first and second single-ended optical sensors measure one or more downhole parameters and do not pass the interrogating optical signals through, and processing the reflected light signals to determine the one or more downhole parameters.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-6E illustrate example tree-based architectures for deploying multiple optical transducers, according to embodiments of the present invention.

DETAILED DESCRIPTION

Multi-point optical sensors and distributed optical sensors have been developed and installed in wells to measure various downhole parameters. A transducer may be used to sense such downhole parameters as pressure and temperature (e.g., P/T gauge). Conventionally, multiple optical single-ended transducers (OSETs) cannot be measured using a single optical fiber deployed down a well. Instead, optical pass-through transducers are used such that light entering one end of a particular transducer is available at the other end of this transducer for the next transducer coupled thereto. In this manner, multiple optical pass-through transducers can be measured using a single optical fiber reaching the surface. However, if one of the optical pass-through transducers is damaged such that light will no longer travel through, then light will not reach transducers located further downhole, limiting the sensing information available.

Accordingly, what is needed are techniques and apparatus for downhole sensing that overcomes these problems.

Embodiments of the present invention provide techniques and apparatus for using optical couplers in a downhole splitter assembly to split interrogating light signals into multiple optical sensing branches. Each optical branch may then be coupled to a sensor (e.g., a pass-through gauge or OSET) or to another optical coupler for additional branching. The sensors may be pressure/temperature (P/T) type transducers. Some systems may use only OSETs coupled to the optical sensing branches. In this manner, if one of the OSETs is damaged, it does not affect light traveling to any of the other sensors, and sensing information from remaining sensors is still returned.

An Example Downhole Sensing System

Figure 1:
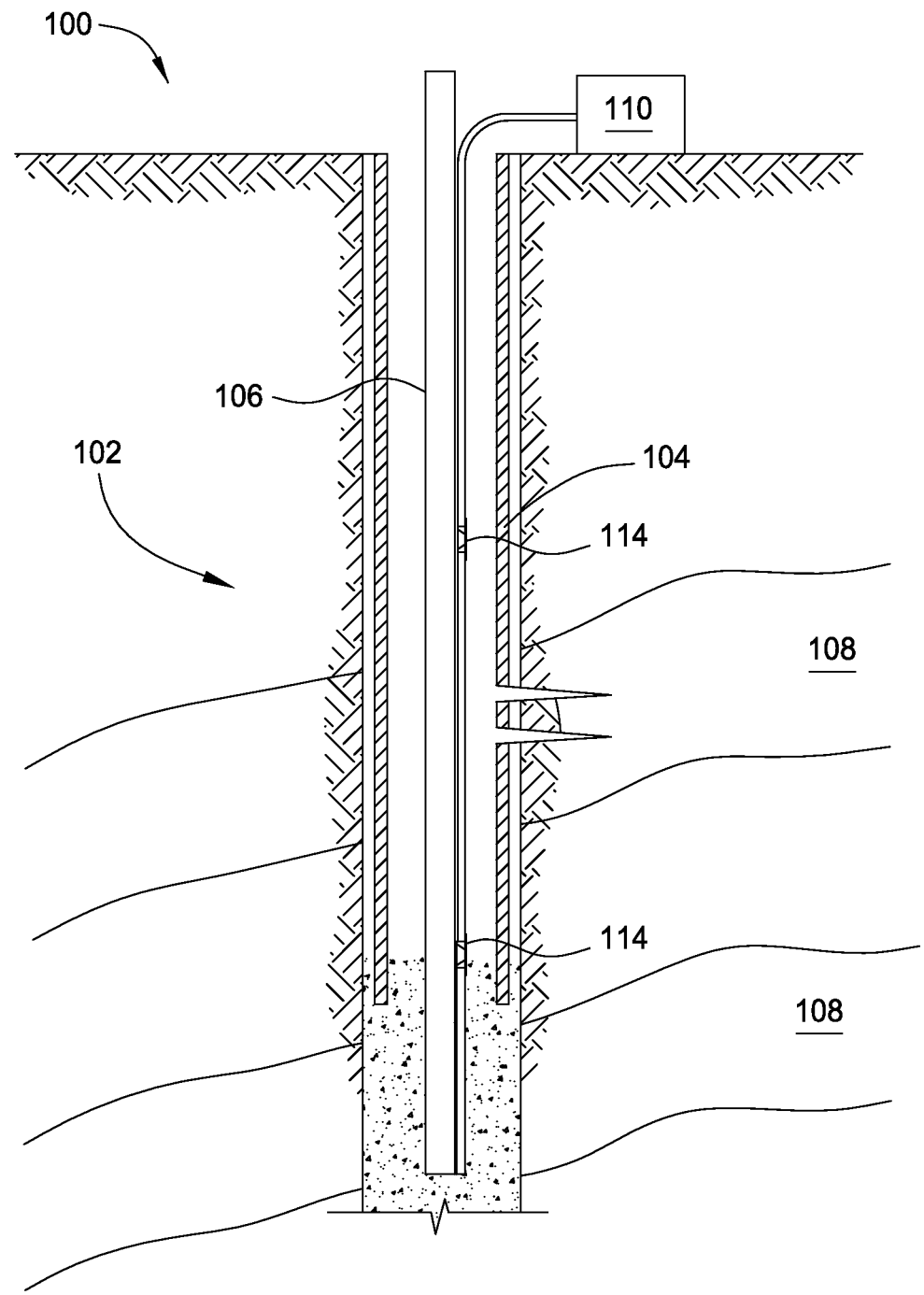
FIG. 1 is a schematic cross-sectional view of an example wellbore having sensors deployed downhole, according to an embodiment of the present invention.

FIG. 1 illustrates a schematic cross-sectional view of a downhole sensing system 100. The system generally includes wellbore 102, wherein a sensing device 110 may be used to determine downhole parameters. The wellbore 102 may have a casing 104 disposed within, through which production tubing 106 may be deployed as part of a wellbore completion. Properties of the wellbore 102, the wellbore completion (e.g., casing, cement, production tubing, packers), and/or downhole formations surrounding or otherwise adjacent the wellbore 102 may be monitored over time based on the sensing. Further, hydrocarbon production may be controlled, or reservoirs 108 may be managed, based on these monitored properties.

Sensing device 110 may include optical waveguide 112 and sensing locations 114 where optical sensors may be deployed. The sensing device 110 may be used to perform sensing and measurements related to the wellbore 102. At least a portion of the system 100 may be disposed adjacent one or more reservoirs 108 downhole.

The sensing device 110 may perform sensing along the optical waveguide 112 at sensing locations 114. The sensing system 100 may employ a single fiber or multiple fibers in the same well and/or multiple wells. For example, multiple fibers may be utilized in different sections of a well, so that sensing may be performed in the different sections. Sensing may occur at relative levels or stations, immediately adjacent depth levels, or spatially remote depths.

The sensing device 110 may include a light source to introduce an optical pulse, using a pulsed laser, for example, into the optical waveguide 112. The sensing system 100 may have various effective measurement spatial resolutions along the optical waveguide 112, depending on the selected pulse widths and optical power of the laser or light source. Thus, the sensing device 110 may include not only an optical source, but one or more processing units for performing signal processing and analysis.

The sensing system 100 may be used to measure any of various suitable downhole parameters, such as pressure, temperature, fluid flow, and the like. The sensing device 110 may include not only an optical source, but one or more processing units for performing signal processing and analysis. Sensors may be used at sensing locations 114. In some embodiments, a sensor may comprise a fiber Bragg grating (FBG) having a characteristic wavelength, λ. This means that a portion of light at the characteristic wavelength will be reflected by the FBG, whereas the remaining portion of the light at the characteristic wavelength (as well as light at other wavelengths) will pass through the FBG. The FBG may be sensitive to changes in some parameter to be measured by the system, for example, pressure or temperature. In this case, the characteristic wavelength of the FBG may shift based on changes in pressure or temperature in the area downhole at the sensing location 114 where the FBG is placed. Thus, parameters of interest may be determined by processing the light reflected from the FBG.

Multiple sensors (e.g., FBG sensors) may be used in a system at multiple sensing locations 114. The sensing locations 114 may be established according to a predetermined spacing or to correspond to selected areas of interest upon deployment. Multiple sensors may be interrogated using wavelength division multiplexing (WDM). In other words, the sensing location 114 of a measurement can be identified by using FBGs having different characteristic wavelengths to multiplex measured disturbances.

In some embodiments, the sensing device 110 may interferometrically measure reflections from sensors disposed at the sensing locations 114. The technique is based on measurement of interference of optical pulses. The optical waveguide 112 may be wrapped or coiled, for example, around production tubing 106. A sensor (e.g., a pair of FBGs) may be coupled to the optical waveguide 112 at each end of the coiled optical waveguide 112. This approach may perform measurements on pairs of FBGs, at a sensing location 114, having the same characteristic wavelength, such that light pulses at characteristic wavelengths are reflected from the FBGs of the pair in such a manner that the reflections will overlap along the optical waveguide 112. An assessment of the phase shift in the overlapping signals can be used to determine the length of the coils. The production tubing 106 may be compliant. Various parameters may therefore cause the production tubing 106 to deform, which in turn perturbs the length of the coils. By processing the changes to the coil lengths, the changes to the radius of the production tubing 106 may be determined. And based on the material properties and characteristics of the production tubing 106, the various parameters inducing the change may also be determined.

An Example Optical Sensor System

Figure 2A:
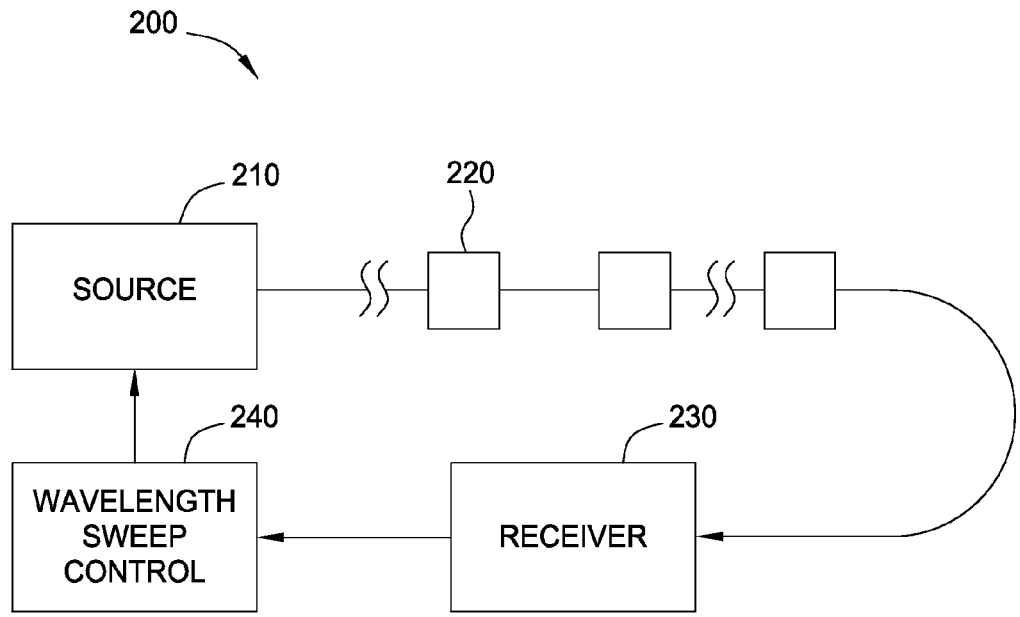
FIG. 2A illustrates an example transmissive optical sensor system with wavelength sweep control, according to an embodiment of the present invention.

FIG. 2A illustrates an example optical sensor system 200 utilizing wavelength sweep control, according to an embodiment of the present invention. The optical sensor system 200 may, for example, be employed in the downhole sensing system 100. As illustrated, the optical sensor system 200 may include a swept-wavelength optical source 210, one or more transmissive optical elements 220 having one or more spectral features of interest (e.g., a characteristic wavelength), and a sweep control unit 240.

The swept-wavelength optical source 210 produces optical radiation at wavelengths and over wavelength ranges (bandwidths) under the control or influence of the sweep control unit 240. The elements 220 may be interrogated with optical radiation from the optical source 210 that is swept across a spectral range including the spectral features of interest. The elements 220 may be sensitive to parameters (e.g., temperatures, pressures, and strain) that affect the attenuation of particular wavelengths of light transmitted through the elements 220 in a known manner.

Referring FIG. 2A, a receiver 230 may include any suitable combination of optical, opto-electronic, and electronic components to process light signals transmitted through the elements 220. Thus, the receiver 230 may be able to generate information about the corresponding parameters, based on the timing of the received light signals and any shifts therein. The receiver 230 may include any suitable combination of components that converts optical signals to electrical signals, filters, and samples. As an example, for one embodiment, the receiver may include an optical PIN diode (i.e., having a lightly doped near intrinsic semiconductor region between a p-type semiconductor region and an n-type semiconductor region), transimpedance amplifier, analog filter, analog-to-digital converter, digital filter, and processing unit (e.g., an embedded processor, industrial or personal computer) for wavelength determination.

As illustrated, the sweep control unit 240 may receive, as input, one or more signals from one or more points in the receiver 230 and, in response, may output signals that influence the sweep of the optical source 210. Examples of typical parameters that the sweep control unit may influence include, but are not limited to, source wavelength, source wavelength sweep range, sweep rate, and/or source optical output power. These influences may include discontinuous or continuous changes in such parameters, for example, multiple sweep bands. The sweep control unit signals can influence a sweep in progress and/or influence future sweeps, as described in greater detail below.

The sweep control unit 240 may be implemented using any suitable processing logic, such as an embedded controller, a programmable logic controller (PLC) or personal computer (PC). While shown as a separate component in the Figures, for some embodiments, the sweep control unit 240 may be integrated into, or be an integral function of the receiver 230, the source 210, and/or both.

Figure 2B:
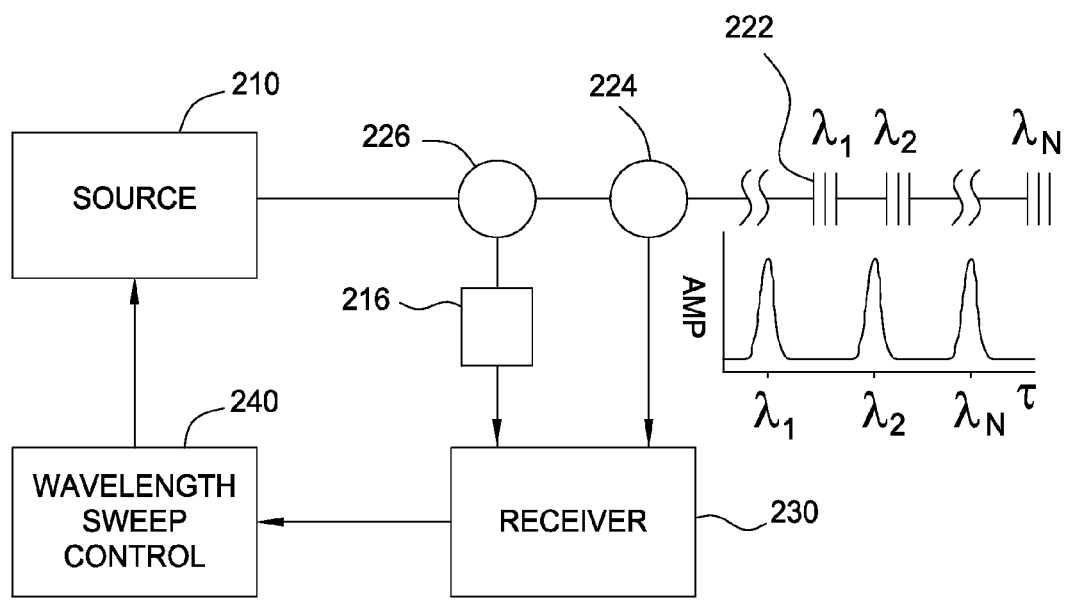
FIG. 2B illustrates an example reflective optical sensor system with wavelength sweep control, according to an embodiment of the present invention.

As illustrated in FIG. 2B, similar techniques may be applied to a system utilizing reflective sensor elements 222, such as Bragg gratings, with the spectral feature of the light reflected dependent upon a sensed parameter. Each Bragg grating 222 may be interrogated by sweeping across a corresponding wavelength range chosen to contain the characteristic wavelength $\lambda$, accounting for the maximum deviations in center wavelengths (areas of peak reflection) expected over the entire range of measured parameters and over time. During this interrogation, response signals are monitored by the receiver 230 in order to determine the time of the response signals, which may be used to determine the characteristic wavelength of the sensor element and, thus, the value of the sensed parameter.

Interrogating optical signals from the source 210 may be directed to the gratings 222 via a bidirectional coupler 224 that also directs reflected response signals to the receiver 230. A splitter 226 may also direct a portion of the interrogating optical signals to a reference element 216, allowing the receiver 230 to monitor optical signals produced by the optical source 220 (e.g., the actual wavelength and power).

Figure 3:
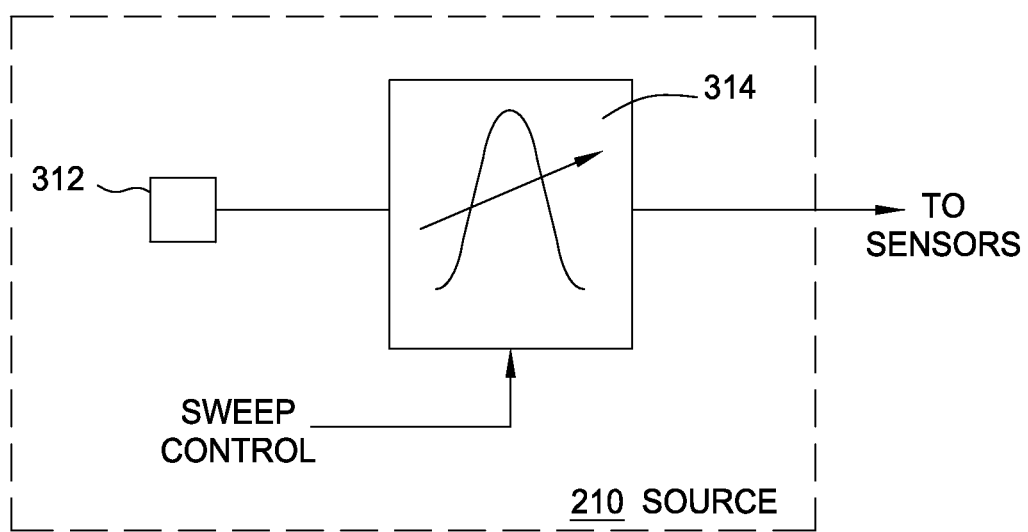
FIG. 3 illustrates an example wavelength sweeping optical source utilizing a tunable filter, according to an embodiment of the present invention.

As illustrated in FIG. 3, one embodiment of the optical source 210 may include a broadband source 312 and a tunable filter 314 that may be controlled by the sweep control unit 240. For example, the sweep control unit 240 may control the tunable filter 214 to adjust a wavelength range (or band) to pass with little or no attenuation while blocking wavelengths outside the range. For other embodiments, the optical source 210 may include a light source that can be controlled to generate optical signals of different wavelengths, such as a tunable laser. For some embodiments, a reference element 216 may be used to measure the wavelength versus the time of the sweep. The wavelength-versus-time measurement may be used to correlate return signal times of light reflected from the optical elements 222 with wavelengths in order to determine a value of a sensed parameter. For example, reference element 216 may be a Fabry-Perot etalon, a gas absorption cell, etc.

Figure 4:
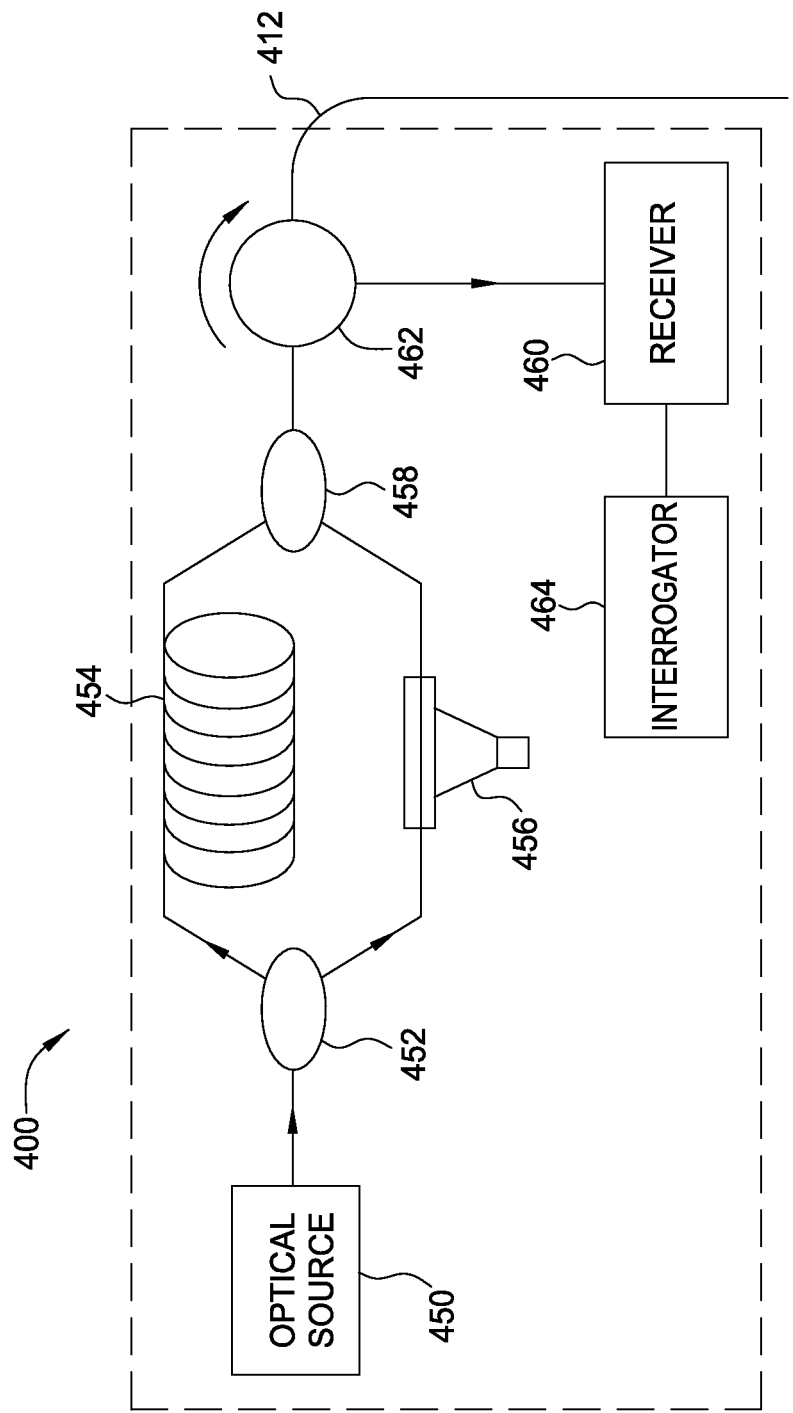
FIG. 4 illustrates an example sensing system used to interferometrically interrogate a pair of fiber Bragg gratings (FBGs), according to an embodiment of the present invention.

FIG. 4 illustrates an example optical sensing system 400 used to interferometrically interrogate a pair of FBGs, according to an embodiment of the present invention. The optical sensing system 400 may be employed, for example, in the downhole sensing system 100. The pair of FBGs that bracket the coils may be interrogated by a series of pulses emitted from optical source 450. These pulses are split in two by an optical coupler 452, and one of the two split pulses is passed through a delay coil 454. A modulator 456 provides modulation to the other split pulse. The pulses are then combined at coupler 458 and directed via optical circulator 460 onto optical waveguide 412. In a preferred embodiment, the time-of-flight through the delay coil 454, and the duration of the pulses emitted from the optical source 450, equal the double-pass time-of-flight of the coils. This provides a non-delayed and a delayed pulse to the optical waveguide 412 which generally abut each other in time. Because the FBGs may be of relatively low reflectivity, the first (non-delayed) pulse will reflect off of the second FBG and appear at the first FBG at the same time that the second (delayed) pulse reflects from the first FBG. This causes the reflected signals to combine, and interfere, on optical waveguide 412. As is well known, by assessing the phase shift within the interfering reflected pulses, the length of the coil can be determined by receiver 462 and the interrogator 464. The results of the determination may be analyzed to determine a parameter of the system.

For some embodiments, adjacent pairs (or sets) of optical elements may each have different characteristic wavelengths such that adjacent pairs of optical elements may be interrogated using WDM.

Example Downhole Sensing System Using Optical Couplers in a Downhole Splitter Assembly An optical coupler is a passive optical component (i.e., takes no power to operate) that can divide or combine light power between multiple optical paths. An optical coupler takes a single fiber input and splits the fiber into two or more different fibers. Couplers are bi-directional and can combine multiple optical signals on to a single fiber with some loss. Splitting a fiber using an optical coupler may enable additional branches of optical single-ended transducers (OSETs) to be used. Mounting techniques may permit use of optical couplers downhole. Using optical couplers downhole to split a fiber into multiple branches departs from the "pass-thru" concept because each OSET will end at its own fiber branch.

The use of multiple OSETs branched off optical couplers ensures that if one transducer fails, it does not cut off communication to everything below the failed transducer as would occur in the "pass-thru" architecture. The use of solely OSETs also allows a similar design for all sensors in the well because both "pass-thru" and single-ended gauges are not used. Because only OSETs are used, these gauges and connections thereto have the same parts, except for sensor wavelengths, resulting in a more cost effective multi-gauge design. Thus, costs are decreased, and reliability is increased.

Techniques and apparatus are described herein for an optical coupler able to withstand the extreme conditions of a downhole environment, such as high temperature and pressure, which may be used in a downhole splitter assembly.

Figure 5:
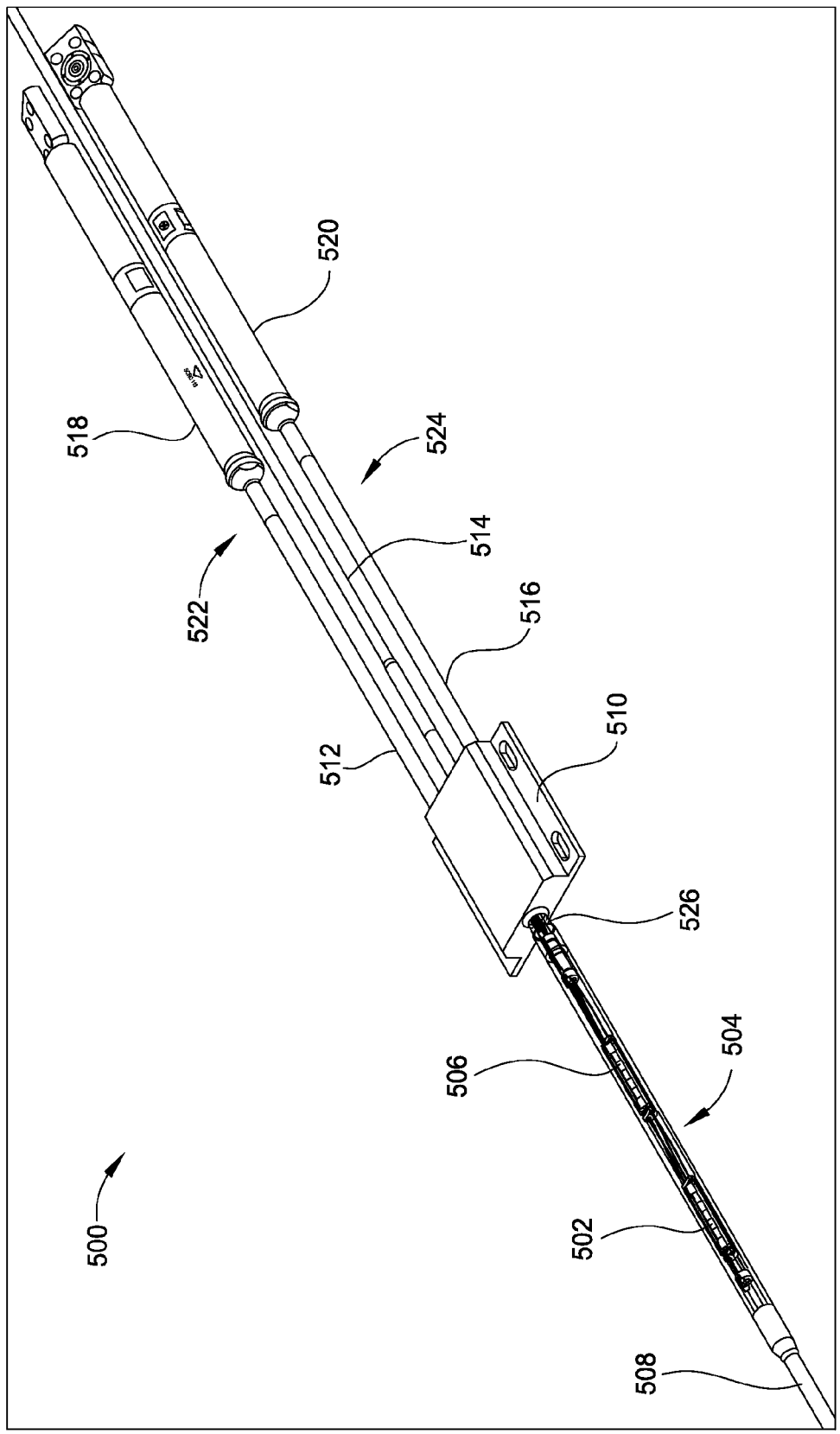
FIG. 5 is a conceptual diagram illustrating an example optical splitter assembly, according to an embodiment of the present invention.

FIG. 5 is a conceptual diagram illustrating an example optical splitter assembly 500, according to an embodiment of the present invention. According to certain embodiments, the splitter assembly 500 may include a cable 508 having one or more optical fibers (channels). The cable 508 may include a splice tube area 504. The splice tube area 504 (optical coupler pressure housing) may have a first optical coupler 502 disposed therein. In some embodiments, the optical coupler 502 may be 70:30 coupler (i.e., 70% of the light power is transmitted on one fiber and 30% on the other fiber), a 50:50 coupler, or other.

According to some embodiments, the splitter assembly 500 may further include a second optical coupler 506. The second optical coupler 506 may be attached in the splitter assembly 500 in a manner similar to that described above for the first optical coupler 502. The first optical coupler 502 may split an incoming optical signal (e.g., from optical source such as optical source 450 or wavelength swept optical source such optical source 210) into two output signals, for example, output A and output B. The second optical coupler 506, which may be downhole from the first optical coupler 502, may also split the optical signal into two outputs, for example, output A and output B.

According to some embodiments, the splitter assembly 500 may further include a third optical coupler 510 downhole from the first and second optical couplers 502 and 506. The third optical coupler 510 (splitter base) may couple the outputs from the first and second optical couplers 502 and 506 into one or more optical sensing branches (e.g., each branch with its own cable). For example, the third optical coupler 510 may take the cable 508 and may couple the outputs of the first and second optical couplers 502 and 504 into multiple cables. For example, the third optical coupler 510 may couple the output A from the first optical coupler 502 and the output A from the second optical coupler 506 to a second cable 512 and may couple the output B from the first optical coupler 502 and the output B from the second optical coupler 506 to a third cable 516. The second cable 512 and the third cable 516 may each include a sensor 518 and 520, for example, a pressure/temperature gauge. The cable 512 and the sensor 518 may form a first optical sensing branch 522 and the cable 516 and the sensor 520 may form a second optical sensing branch 524. In some embodiments, the cables 512 and 516 may terminate at the gauges, for example, the P/T gauges may be single-ended (OSETs).

In some embodiments, the third optical coupler 510 may further couple the cable 510 and the outputs of the first and second optical couplers 502 and 506 to one or more fourth cables 514. For example, the third optical coupler 510 may couple the output B of the first optical coupler 502 and the output B of the second optical coupler 506 to cable 514. The cable 514 may extend further downhole (i.e., bypass) and may be further split by an additional optical coupler into additional optical sensing branches or may terminate at another sensor. For some embodiments, OSETs may be the only type of sensor used in the system.

In some embodiments, the splitter assembly 500 may be used downhole, for example, in the downhole sensing system 100. In embodiments, the splitter assembly 500 may use various numbers of optical couplers and the outputs may combined in various optical sensing branches. In some embodiments, pass-through gauges may be used additionally or alternatively to the single-ended gauges. For example, the splitter assembly 500 may be used downhole (e.g., in the wellbore 102) to split the optical waveguide 112 into multiple optical sensing branches. In some embodiments, a swept-wavelength approach or interferometric approach may be used to interrogate the sensors as described above with respect to FIGS. 2-4. For example, the optical sensing branches may be coupled to OSETs having different characteristic wavelengths.

FIGS. 5A-5F illustrate an example technique for attaching optical couplers in the optical coupler splitter assembly of FIG. 5, according an embodiment of the present invention.

Figure 5B:
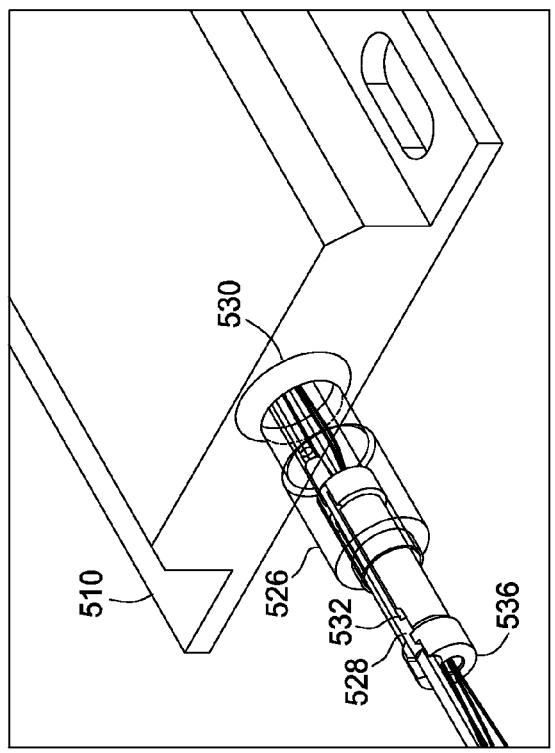
FIGS. 5A-5F illustrate an example technique for attaching optical couplers in the optical coupler splitter assembly of FIG. 5, according an embodiment of the present invention.
Figure 5A:
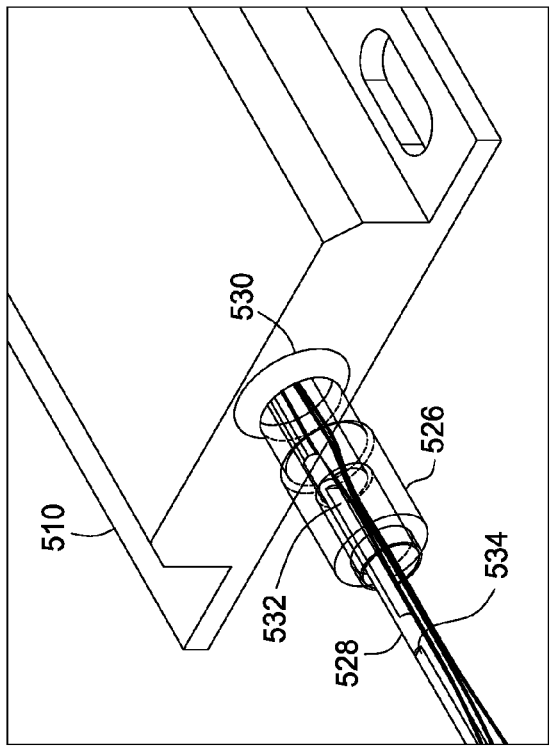

As illustrated in FIG. 5A, the third optical coupler 510 (splitter base) may have a port 530 and a threaded adapter 526. A threaded rod 528 may attach to the third optical coupler 510 by screwing in to the port 530 and threaded adapter 526. The threaded rod 528 may have a first set of flats 532 and a second set of flats 534 ninety degrees from the first set of flats 532. As illustrated in FIG. 5B, the threaded rod 528 may attach to a heat sink 536 by sliding the heat sink 538 parallel to the first of flats 532 where features of the heat sink 536 may mate with the first set of flats 532.

Figure 5E:
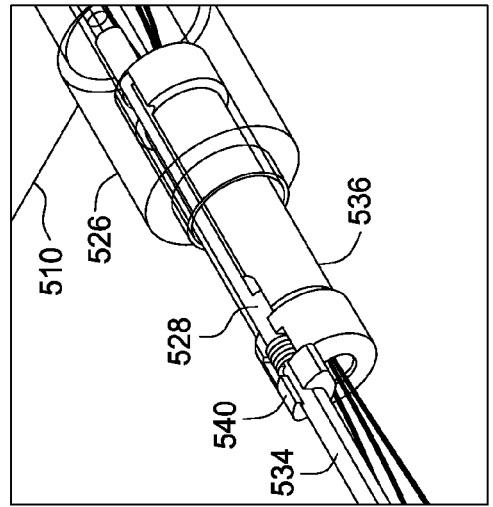
Figure 5D:
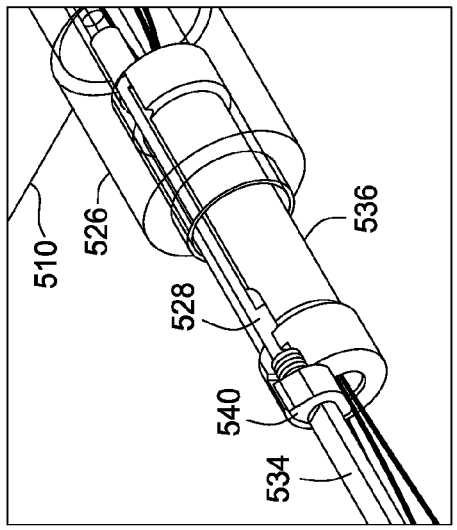
Figure 5C:
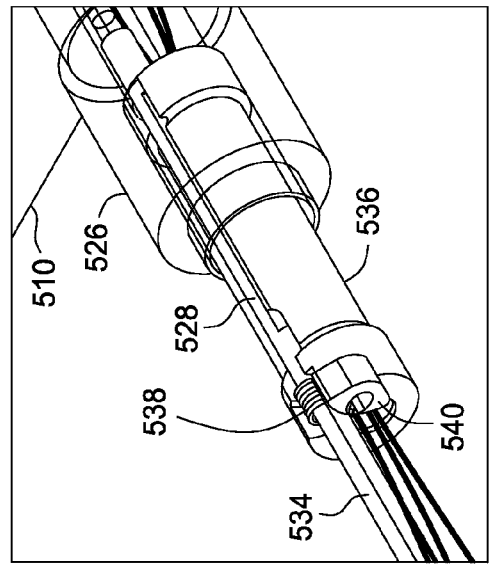

The heat sink 536 attached to the threaded rod 528 may serve to prevent the threaded rod 528 from backing off as well as to protect the fibers during welding or manufacturing, for example. As illustrated in FIG. 5C, the heat sink 536 may also include a heat sink anti-vibration spring 538 into which the threaded rod 528 may be inserted. As also illustrated in FIG. 5C, a lock nut 540 may attach the heat sink 536 in place on the threaded rod 528. The lock nut 540 slide parallel to the second set of flats 534 on the threaded 528 to abut the end of the heat sink 536. As shown in FIG. 5D, the lock nut 540 may be engaged onto the threaded rod 528 and, as illustrated in FIG. 5E, the lock nut 540 may then be rotated ninety degrees in order to engage the threads on the threaded rod 528, thereby locking the lock nut 540 on to the threaded rod 528.

Figure 5F:
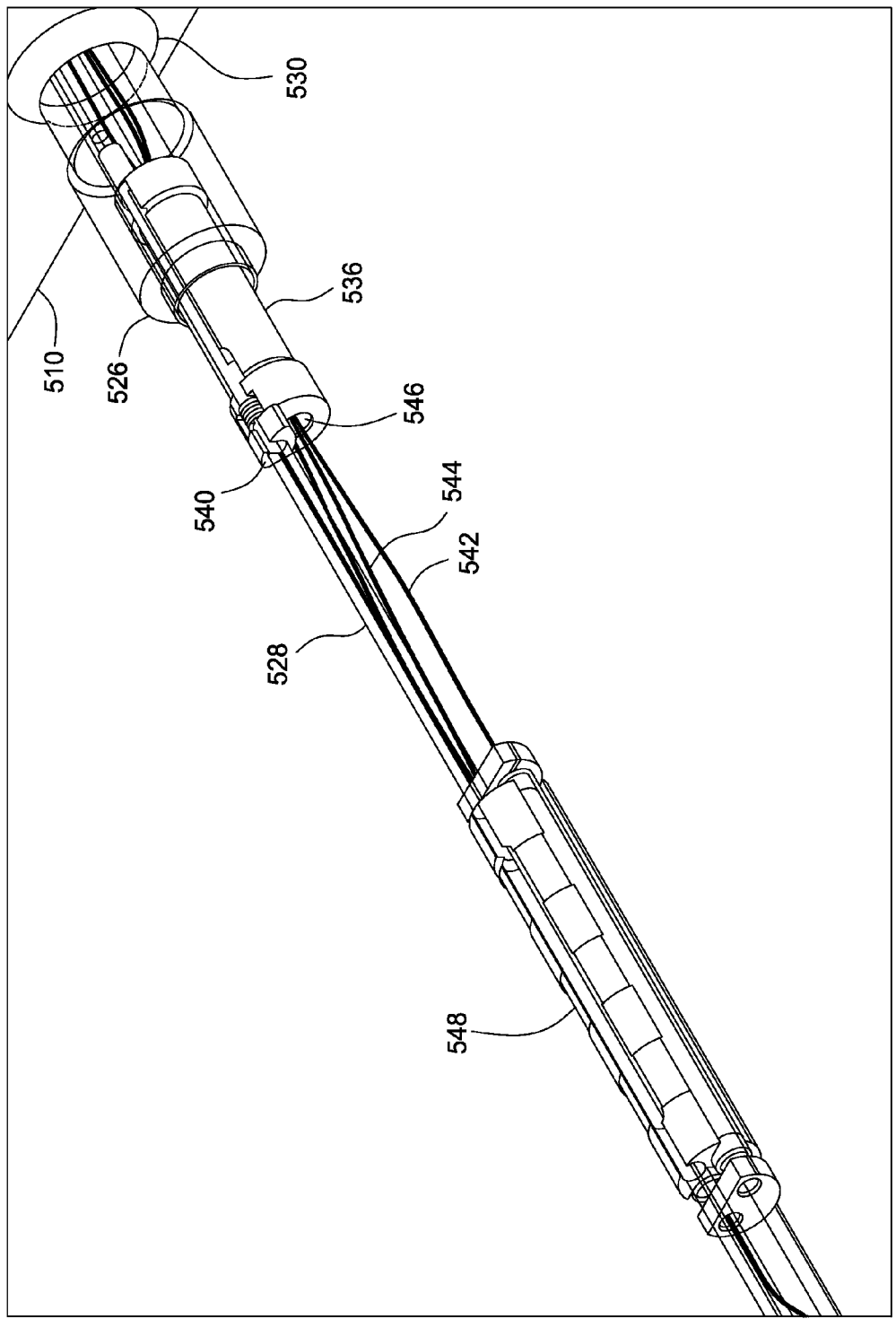

FIG. 5F illustrates attachment of an optical coupler housing 548. In some embodiments, the optical coupler housing 548 may be attached in a similar manner as the lock nut 540 in FIGS. 5C-5E. For example, the optical coupler housing 548 may slide parallel to the a set of flats on the threaded rod 528, and may then be rotated ninety degrees (screwed on) in order to engage the threads of the threaded rod 528. In embodiments, the optical coupler housing 548 may be attached at any desired point on the threaded rod 528. As also illustrated in FIG. 5F, optical fibers 542 and 544 may pass through the optical coupler housing 548 and may pass through the heat sink 536 via a fiber passage hole 546. In embodiments, the optical coupler 502 may be house in a PolyTetraFluroEthylene (PTFE) tube.

Thus, as shown in FIGS. 5A-5F, the threaded rod 540 may enable the components to attached in various places and can therefore be at a desired spacing, for example, in order to maintain proper thermal expansion.

This approach may provide several benefits. For example, because of the use of optical couplers before light reaches a transducer, if a transducer fails, communication is not interrupted with the other optical sensing branches and thus, not interrupted with other transducers in the system, as may be the case in a "pass-thru" design on a single optical fiber.

FIGS. 6A-6E illustrate various example "tree-based" architectures for a downhole sensing system, which may use various numbers of optical fibers, optical splitters, and sensors. As shown in FIGS. 6A-6E, various numbers of optical sensing branches may be formed using a number of downhole optical couplers (splitters), such as optical couplers 502, 506, and 510 from splitter assembly 500 to form a tree-based architecture. The various optical sensing branches may be further split into more optical branches or may be coupled to a sensor. For example, an optical sensing branch may terminate with an OSET, a pass-through transducer, or an optical coupler or may remain unconnected.

Figure 6A:
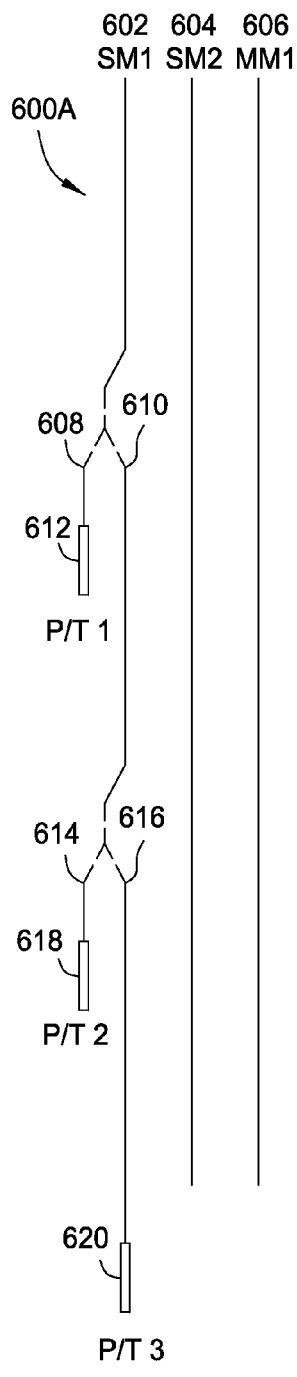

In the example tree-architecture 600A shown in FIG. 6A, a single optical fiber may incrementally branch off into a sensor at different depths downhole. As shown in architecture 600A illustrated in FIG. 6A, a sensing device (e.g., such as sensing device 110) may be coupled to multiple optical waveguides 602, 604, 606 (e.g., in one cable or in multiple cables). The optical waveguides 602, 604, 606 may be single-mode (SM) or multimode (MM) optical fibers. A single-mode optical fiber has a smaller core (i.e., on the order of 9 μm) and allows only one ray/mode to propagate through the fiber core. Multimode optical fibers have a larger core (i.e., on the order of 50 μm or 65 μm) and allow multiple rays/modes to couple and propagate simultaneously down the optical fiber.

In the example embodiment shown in FIG. 6A, the sensing device is coupled to two single-mode optical fibers 602, 604 and a multimode optical fiber 606. Optical fiber 602 may be split, for example by a splitter assembly (e.g., similar to splitter assembly 500) into two fibers forming optical sensing branches 608 and 610. Optical sensing branch 608 may be coupled to a sensor, for example, an optical single-ended transducer (OSET) P/T sensor 612, which may be deployed at a location near the point of splitting. Optical sensing branch 610 may be further split into two fibers forming additional optical sensing branches 614 and 616, by a second splitter assembly. Optical sensing branch 614 may be coupled to another sensor 618, which may also be an OSET P/T gauge (which may have a different characteristic wavelength than sensor 612), disposed near the point of splitting, at a location further downhole than sensor 612. Optical sensing branch 616 may be coupled to sensor 620, at a point further downhole than sensor 618, which may be, for example, another OSET P/T gauge (which may have different characteristic wavelength than sensors 618 and 612). As shown, optical fibers 604 and 606 may not be split.

Figure 6B:
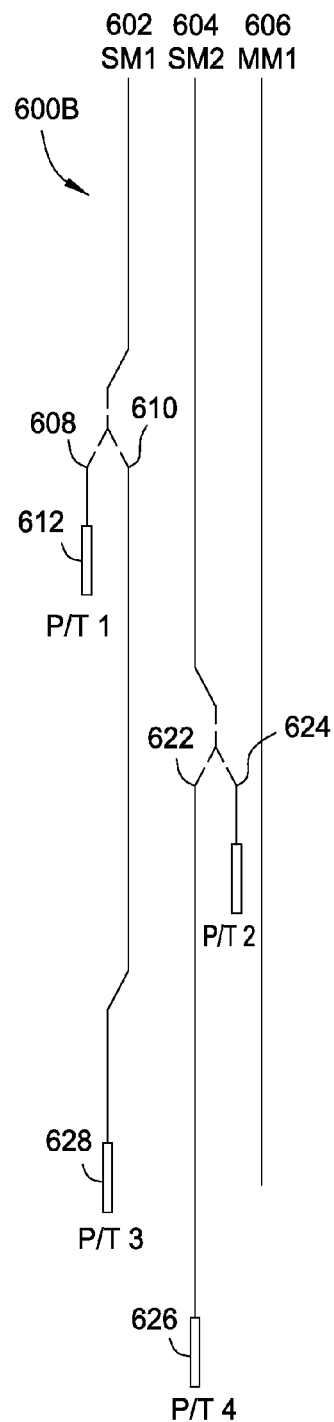

In the example tree-architecture 600B shown in FIG. 6B, two separate optical fibers may be split at different depths downhole. As shown in FIG. 6B, in some embodiments, optical sensing branch 610 may not be split, but may be coupled only to the sensor 618, for example, at a location which may be further downhole than sensor 612. In the example architecture shown in FIG. 6B, optical fiber 604 may also be split into two fibers forming optical sensing branches 622 and 624. Optical sensing branch 622 may be coupled to a sensor 626, which may be an OSET P/T gauge, at a location which may be further downhole than sensor 618. Optical sensing branch 624 may be coupled to sensor 628, which may also be an OSET P/T gauge, at a location near to the point of splitting, which may be disposed further downhole than sensor 612, but shallower than sensor 618.

Figure 6C:
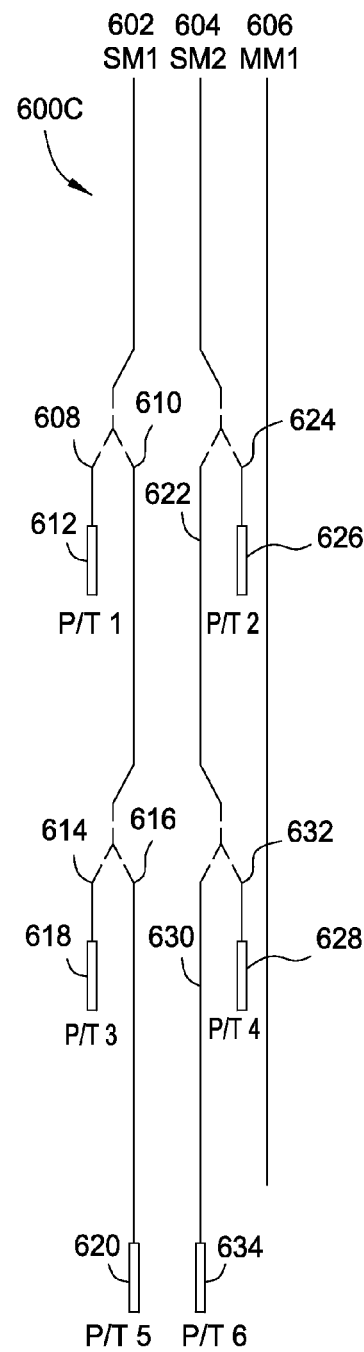

In the example tree-architecture 600C shown in FIG. 6C, two separate optical fibers may branch off into sensors at similar depths downhole. As shown in FIG. 6C, in some embodiments, optical sensing branch 622 (branching off optical fiber 604) may be further split into additional optical sensing branches 630 and 632. Optical sensing branch 630 may be coupled to sensor 634, which may be an OSET P/T gauge, at a location which may be at the same distance downhole as sensor 620. Optical sensing branch 632 may be coupled to sensor 628, which may be disposed at a location near to the point of splitting and the same distance downhole as sensor 618.

In the example tree-architecture 600D shown in FIG. 6D, an optical fiber may be split and both branches may couple to sensors at the same depth downhole. As shown in FIG. 6D, in some embodiments, optical sensing branch 610 may not be split into any additional optical sensing branches, and instead couple to sensor 618 at a location near to the point of splitting and at the same distance downhole as sensor 612.

In the example tree-architecture 600E shown in FIG. 6E, an optical fiber may be split into two optical sensing branches, and one of the optical sensing branches may further split into two additional optical sensing branches. The un-split optical sensing branch and one of the further additional optical sensing branches may couple to an optical sensor at the same distance downhole, and the remaining optical sensing fiber may be a bypass branch (a bypass fiber). As shown in FIG. 6E, in some embodiments, optical sensing branch 608 may couple to sensor 612 further downhole from the point of splitting, and the point of splitting optical sensing branch 610 into additional optical sensing branches 614 and 616 may be disposed at a location near to the point of splitting optical fiber 602 into optical sensing branches 608 and 610. Thereby, optical sensing branch may be coupled to sensor 620 at a location the same distance downhole as sensor 612. Optical sensing branch 614 may be a bypass branch for coupling further downhole.

Figure 7:
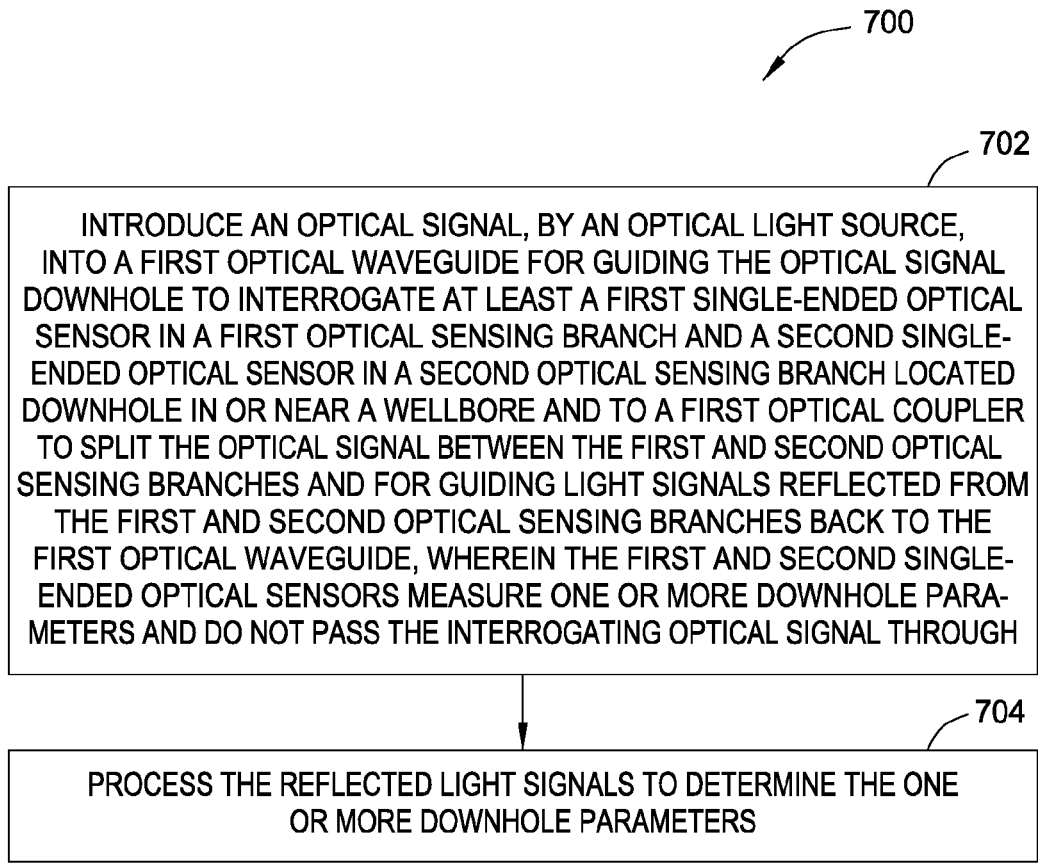
FIG. 7 is a block diagram illustrating example operations for determining one or more downhole parameters, according to an embodiment of the present invention.

FIG. 7 is a flow diagram of example operations 700 for determining one or downhole parameters (e.g., pressure and/or temperature), according to an embodiment of the present invention. The operations 700 may begin, at 702, by introducing an optical signal, by an optical light source, into a first optical waveguide for guiding the optical signal downhole to interrogate at least a first single-ended optical sensor in a first optical sensing branch and a second single-ended optical sensor in a second optical sensing branch located downhole in or near a wellbore and to a first optical coupler to split the optical signal between the first and second optical sensing branches and for guiding light signals reflected from the first and second optical sensing branches back to the first optical waveguide, wherein the first and second single-ended optical sensors measure one or more downhole parameters and do not pass the interrogating optical signals through.

At 704, the reflected light signals may be processed to determine the one or more downhole parameters. In embodiments, the first optical coupler may further split the interrogating light signals between at least a third optical sensing branch. In embodiments, the first optical waveguide may further guide the optical signal downhole to a splitter assembly, downstream of the first optical coupler, to couple the first optical waveguide into at least a second optical waveguide for guiding interrogating light downhole to interrogate optical sensors in the first optical sensing branch and a third optical waveguide for guiding interrogating light downhole to interrogate optical sensors in the second optical sensing branch. In embodiments, at least one of the optical sensors may be used to measure both pressure and temperature.

In embodiments, the first optical waveguide may further guide the optical signal downhole to a second optical coupler to split the interrogating light signals between the third and fourth optical sensing branches and to guide light signals reflected from the third and fourth optical sensing branches first back to the first optical waveguide and the splitter assembly may further couple the first optical waveguide into a fourth optical waveguide for guiding interrogating light downhole to interrogate optical sensors in the at least one of the third or fourth optical sensing branches.

In embodiments, the first optical coupler may be mounted within a cable by a mounting assembly. The mounting assembly may include a rod having a plurality of threads, a first set of flats, and a second set of flats located ninety degrees from the first set of flats; a heat sink coupled to the splitter assembly having a mating feature, wherein the first set of flats mates with the mating feature of the heat sink to secure the rod to the splitter assembly; and a housing, having a third set of flats, coupled to the first optical coupler, wherein the third set of flats mate parallel with the second flats, and wherein the housing is configured to rotate ninety degrees to engage the plurality of threads to secure the housing to the rod.

Any of the operations described above, such as the operations 700, may be included as instructions in a computer-readable medium for execution by the receiver 130 or any other processing system. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

Those skilled in the art will also recognize that different aspects described herein may be combined, for some embodiments. As an example, for some embodiments, wavelength sweep control logic may be configured to perform different combinations of operations shown in the flow diagrams described above, to provide different combinations of features.

While the foregoing is directed to embodiments of the present invention, other and further embodiments of the invention may be devised without departing from the basic scope thereof, and the scope thereof is determined by the claims that follow.

The invention claimed is:

1. A system, comprising:
   at least first and second optical sensing branches located downhole in or near a wellbore, each of the optical sensing branches having at least one single-ended optical sensor to measure one or more downhole parameters that does not pass interrogating light signals through;
   a first optical waveguide for guiding the interrogating light signals downhole to interrogate optical sensors in each of the first and second optical sensing branches;
   a first optical coupler to split the interrogating light signals between the first and second optical sensing branches and to guide light signals reflected from the first and second optical sensing branches back to the first optical waveguide;
   a splitter assembly, downstream of the first optical coupler, to couple the first optical waveguide into at least a second optical waveguide for guiding the interrogating light signals downhole to interrogate optical sensors in the first optical sensing branch and a third optical waveguide for guiding the interrogating light signals downhole to interrogate optical sensors in the second optical sensing branch; and
   a cable, wherein the first optical waveguide is disposed within the cable, wherein the first optical coupler is mounted within the cable by a mounting assembly, and wherein the mounting assembly comprises a rod secured to the splitter assembly, a heat sink coupled to the splitter assembly, and a housing coupled to the first optical coupler.

2. The system of claim 1, wherein the system further comprises at least a third optical sensing branch, and wherein the first optical coupler is further configured to split the interrogating light signals between the at least a third optical sensing branch.

3. The system of claim 1, wherein the one or more downhole parameters comprise at least one of pressure or temperature.

4. The system of claim 3, wherein at least one of the optical sensors is used to measure both pressure and temperature.

5. The system of claim 1, further comprising a processor to determine the one or more downhole parameters based, at least in part, on the reflected light signals.

6. The system of claim 1, further comprising a light source for generating the interrogating light signals.

7. The system of claim 1, further comprising:
   at least third and fourth optical sensing branches; and
   a second optical coupler to split the interrogating light signals between the third and fourth optical sensing branches and to guide light signals reflected from the third and fourth optical sensing branches back to the first optical waveguide.

8. The system of claim 7, wherein the splitter assembly further couples the first optical waveguide into a fourth optical waveguide for guiding the interrogating light signals downhole to interrogate optical sensors in the at least one of the third or fourth optical sensing branches.

9. The system of claim 1, wherein:
the rod has a plurality of threads, a first set of flats, and a second set of flats located ninety degrees from the first set of flats;
the heat sink has a mating feature;
the first set of flats mates with the mating feature of the heat sink to secure the rod to the splitter assembly;
the housing, has a third set of flats, coupled to the first optical coupler;
the third set of flats mates parallel with the second set of flats; and
the housing is configured to rotate ninety degrees to engage the plurality of threads to secure the housing to the rod.

10. The system of claim 1, further comprising:
a light source for generating the interrogating light signals; and
a processor to determine the one or more downhole parameters based, at least in part, on the reflected light signals.

11. A system comprising:
at least first and second optical sensing branches located downhole in or near a wellbore, each of the optical sensing branches having at least one single-ended optical sensor to measure one or more downhole parameters that does not pass interrogating light signals through;
a first optical waveguide for guiding the interrogating light signals downhole to interrogate optical sensors in each of the first and second optical sensing branches, wherein at least one of the optical sensors comprises a pass-through optical sensor that passes the interrogating light signals through to at least one other sensor; and
a first optical coupler to couple the first and second optical sensing branches to the first optical waveguide.

12. A method, comprising:
introducing interrogating light signals, by an optical light source, into a first optical waveguide for:
guiding the interrogating light signals downhole to:
a first optical coupler to split the interrogating light signals between a first optical sensing branch and a second optical sensing branch located downhole in or near a wellbore; and
a splitter assembly, downstream of the first optical coupler, to couple the first optical waveguide into at least a second optical waveguide for guiding the interrogating light signals downhole to interrogate one or more optical sensors in the first optical sensing branch and a third optical waveguide for guiding the interrogating light signals downhole to interrogate one or more optical sensors in the second optical sensing branch, each of the optical sensing branches having at least one single-ended optical sensor to measure one or more downhole parameters that does not pass the interrogating light signals through, wherein:
the first optical waveguide is disposed in a cable, the first optical coupler is mounted in the cable by a mounting assembly, and
the mounting assembly comprises a rod secured to the splitter assembly, a heat sink coupled to the splitter assembly, and a housing coupled to the first optical coupler; and
guiding light signals reflected from the first and second optical sensing branches back to the first optical waveguide; and
processing the reflected light signals to determine the one or more downhole parameters.

13. The method of claim 12, wherein the first optical coupler further splits the interrogating light signals between at least a third optical sensing branch.

14. The method of claim 12, wherein the one or more downhole parameters comprise at least one of pressure or temperature.

15. The method of claim 14, wherein at least one of the optical sensors is used to measure both pressure and temperature.

16. The method of claim 12, wherein the first optical waveguide further guides the interrogating light signals downhole to a second optical coupler to split the interrogating light signals between a third optical sensing branch and a fourth optical sensing branch and to guide light signals reflected from the third and fourth optical sensing branches back to the first optical waveguide.

17. The method of claim 16, wherein the splitter assembly further couples the first optical waveguide into a fourth optical waveguide for guiding the interrogating light signals downhole to interrogate optical sensors in at least one of the third or fourth optical sensing branch.

18. The method of claim 12, wherein:
the rod has a plurality of threads, a first set of flats, and a second set of flats located ninety degrees from the first set of flats;
the heat sink has a mating feature;
the first set of flats mates with the mating feature of the heat sink to secure the rod to the splitter assembly;
the housing, has a third set of flats, coupled to the first optical coupler the third set of flats mates parallel with the second set of flats; and
the housing is configured to rotate ninety degrees to engage the plurality of threads to secure the housing to the rod.

19. A method comprising:
introducing an optical signal, by an optical light source, into a first optical waveguide for:
guiding the optical signal downhole to:
one or more optical sensors in a first optical sensing branch and one or more optical sensors in a second optical sensing branch, located downhole in or near a wellbore, each of the optical sensing branches having at least one single-ended optical sensor to measure one or more downhole parameters that does not pass the optical signal through; and
a first optical coupler to split the optical signal between the first and second optical sensing branches; and
guiding light signals reflected from the first and second optical sensing branches back to the first optical waveguide, wherein at least one of the optical sensing branches comprises a pass-through optical sensor that passes the optical signal through to at least one other sensor; and
processing the reflected light signals to determine the one or more downhole parameters.

* * * * *